Patented Feb. 7, 1928.

1,658,368

UNITED STATES PATENT OFFICE.

LEONARD E. BRANCHEN AND CHAUNCEY U. PRACHEL, OF ROCHESTER, NEW YORK, ASSIGNORS TO EASTMAN KODAK COMPANY, OF ROCHESTER, NEW YORK, A CORPORATION OF NEW YORK.

PROCESS FOR REDUCING THE VISCOSITY CHARACTERISTICS OF CELLULOSE ACETATE.

No Drawing.  Application filed October 6, 1926.  Serial No. 139,954.

This invention relates to processes for reducing the viscosity characteristics of cellulose acetate. One object of the invention is to provide a relatively simple, safe, and readily controllable or repeatable process for reducing the viscosity characteristics of cellulose acetate without seriously impairing its flexibility and other filming qualities. Other objects will hereinafter appear.

The widest used cellulose acetates at the present time are those which are soluble in acetone. While our process is capable of successfully treating other forms of cellulose acetate, such as chloroform-soluble cellulose acetate, we shall describe the application of our process principally to the acetone-soluble species. It can be readily applied, for example, to the powdered cellulose acetate provided by the process described in U. S. Patent 1,516,225, Webb, November 18, 1924, as well as to other forms of cellulose acetate, such as those described in U. S. Reissue Patent 12,637, Miles, April 23, 1907.

Cellulose acetates of this kind give viscose solutions in their solvents, such as acetone for instance, when the concentration is high. This is very useful in film manufacture; but it is desirable that lacquer solutions shall be both concentrated and of low viscosity for brushing, spreading, spraying, etc. Cellulose acetates which combine high solubility with low viscosity characteristics, can be prepared by control of known methods of acetation. However, it is desirable to have an alternative method by means of which already prepared cellulose acetates can be modified so that their solubility may be maintained and their viscosity characteristics be lowered to the desired degree. This result is more difficult to attain than in the case of cellulose nitrate.

We have found that the viscosity characteristics of cellulose acetate can be usefully reduced while maintaining an adequate solubility, by submitting it to ultra-violet rays while it is dissolved in a fatty acid. The result of the combined use of ultra-violet rays and the fatty acid is greater than the result obtained by either of these agencies alone. We can employ any of the fatty acids, liquid at room temperature, which dissolve the particular variety of cellulose acetate that is under treatment. Such acids include formic, acetic, propionic, butyric, valeric, caproic, heptylic. The solvent power decreases as the molecular weight increases and the cost of the higher members is greater than that of the lower members. Consequently, we prefer to employ a fatty acid which has less than three carbon atoms,—namely, acetic acid or formic acid. Of these two, formic acid has the advantage that its use in our process yields cellulose acetates which form particularly flexible films.

We shall now describe several ways of carrying out our process, but it will be understood that our invention is not restricted to the details thus given, except as indicated in the appended claims.—Ten parts, by weight, of acetone-soluble cellulose acetate, say in the form of a fine powder produced by the process of the Webb patent, cited above, is dissolved in 90 parts of formic acid. The latter can be the commercial variety of about 90% strength. This solution is subjected to ultra-violet rays from any suitable source until samples, when tested, show that the desired lowering of viscosity has taken place. Any convenient source of ultra-violet radiation may be employed. We have found, for instance, that a mercury vapor lamp of the quartz tube variety is practical. The solution under treatment is preferably kept in a vessel which is transparent to the ultra-violet rays, at least on the side of the vessel facing the lamp. A quartz vessel or a vessel containing a quartz window is especially useful, although special glasses which are somewhat transparent to ultra-violet rays can be employed, if the time of the operation be prolonged. Operating at room temperature with the above solution in a quartz vessel approximately 18" from the quartz mercury vapor lamp, we have obtained in roughly 50 hours, a viscosity ranging from one half to one fifteenth that of the cellulose acetate before treatment. The typical quartz mercury vapor lamp which we have employed, operates, after preliminary warming up, at about 160 to 175 volts using from 3.2 to 4 amperes, but these figures can be widely varied, according to the particular lamp used.

When a sample, after being washed dried and dissolved to a standard concentration in acetone at a test temperature, shows the desired lowering of viscosity, the whole batch of material from which the sample was taken is treated to separate the cellulose acetate from the acid in which it is dissolved. This can be done by stirring the solution into water, say while in the form of threads or filaments, then collecting and washing the precipitate thus formed. This gives a quite voluminous form of acetate. Instead of water, other precipitants may be employed, such as alcohol, benzol, toluol, petroleum naphtha, etc., the acid being recovered from the mixture by distillation. The acid may also be recovered by the spray-drying method shown in the Webb patent hereinabove cited, or by the vacuum distillation method shown in U. S. Patent, 1,560,620, Sulzer, November 10, 1925. Of course, the temperatures and other working details in these methods of recovery are modified to conform to the properties of the formic acid, particularly its slightly lower boiling point as compared to acetic acid.

In place of the 90 parts, by weight, of formic acid in the example given above, we may substitute glacial acetic acid, the operations being otherwise identical. Since both formic and acetic acids are solvents of chloroform-soluble cellulose acetate, the above described processes are applicable to it, although it is generally more convenient to deal with the acetone-soluble species. While we prefer to work at room temperature, the solution may be warmed somewhat during the process to a temperature in which the acetate is not harmed.

Having thus described our invention, what we claim as new and desire to secure by Letters Patent is:

1. In the process of reducing the viscosity characteristics of cellulose acetate, submitting said cellulose acetate to ultra-violet rays while dissolved in a fatty acid, liquid at room temperature, which is a solvent for said acid, until the viscosity characteristics of said acetate, when tested in acetone, are reduced.

2. In the process of reducing the viscosity characteristics of cellulose acetate, submitting said cellulose acetate to ultra-violet rays while dissolved in a fatty acid having less than three carbon atoms, until the viscosity characteristics of said cellulose acetate, when tested in acetone, are reduced.

3. In the process of reducing the viscosity characteristics of acetone-soluble cellulose acetate, submitting said cellulose acetate to ultra-violet rays while dissolved in formic acid, until the viscosity characteristics of said cellulose acetate, when tested in acetone are reduced.

Signed at Rochester, New York, this 20 day of September, 1926.

LEONARD E. BRANCHEN.
CHAUNCEY U. PRACHEL.